United States Patent [19]

Gable et al.

[11] Patent Number: 4,550,402

[45] Date of Patent: Oct. 29, 1985

[54] DATA COMMUNICATION SYSTEM

[75] Inventors: Melvin G. Gable, Ypsilanti, Mich.; Richard H. Sherman, Fremont, Calif.; Fumin Yuan, Canton, Mich.

[73] Assignee: Ford Motor Company, Dearborn, Mich.

[21] Appl. No.: 564,611

[22] Filed: Dec. 22, 1983

[51] Int. Cl.⁴ .......................... H04J 3/02; H04Q 11/04
[52] U.S. Cl. ......................................... 370/85; 370/60; 370/67; 370/94
[58] Field of Search ........................ 370/85, 94, 60, 67

[56] References Cited

U.S. PATENT DOCUMENTS

| | | | |
|---|---|---|---|
| 4,063,220 | 12/1977 | Metcalfe et al. | 340/147 LP |
| 4,074,232 | 2/1978 | Otomo et al. | 340/147 R |
| 4,156,798 | 5/1979 | Doelz | 179/15 AL |
| 4,161,786 | 7/1979 | Hopkins et al. | 364/900 |
| 4,234,952 | 11/1980 | Gable et al. | 370/94 |
| 4,317,196 | 2/1983 | Ulug | 370/94 |
| 4,451,827 | 4/1984 | Kahn et al. | 370/60 |
| 4,481,626 | 11/1984 | Boggs | 370/85 |

OTHER PUBLICATIONS

Telecommunication and the Computer, 2nd Ed., Prentice-Hall, Englewood Cliffs, N.J., 1976.

A Protocol for Packet Network Intercommunication, IEEE Trans. Comm., May 1974, pp. 637-648.

Primary Examiner—Douglas W. Olms
Assistant Examiner—Curtis Kuntz
Attorney, Agent, or Firm—Paul K. Godwin, Jr.; Robert D. Sanborn

[57] ABSTRACT

A data communication system for providing data transmission between a plurality of individually addressable local computer networks, by utilizing single node switching across a common passive bus medium. The passive bus medium is characterized as having a plurality of separate conductors of limited length that are each commonly connected to individual bus interface circuits for each local computer network. Each bus interface circuit has a number of dedicated address data ports, message data ports and control ports that are connected to separate dedicated conductors of the passive bus medium for transmitting data to and receiving data from other local computer networks. Each message transmission of data on the passive bus medium is divided into a number of mini-packets each of which contain a number of parallely transmitted bits corresponding to the number of dedicated address and message conductors in the passive bus medium. Each mini-packet is separately transmitted on the passive bus medium and separately acknowledged by the designated receiving bus interface circuit. Mini-packets are of two types for each message. The first group of mini-packets precedes the second group and contains destination address in its header portion and word count information in its message portion. The second group constitutes the remainder of the message and each mini-packet of this group contains the source address in the header portion and message data in the message portion.

9 Claims, 11 Drawing Figures

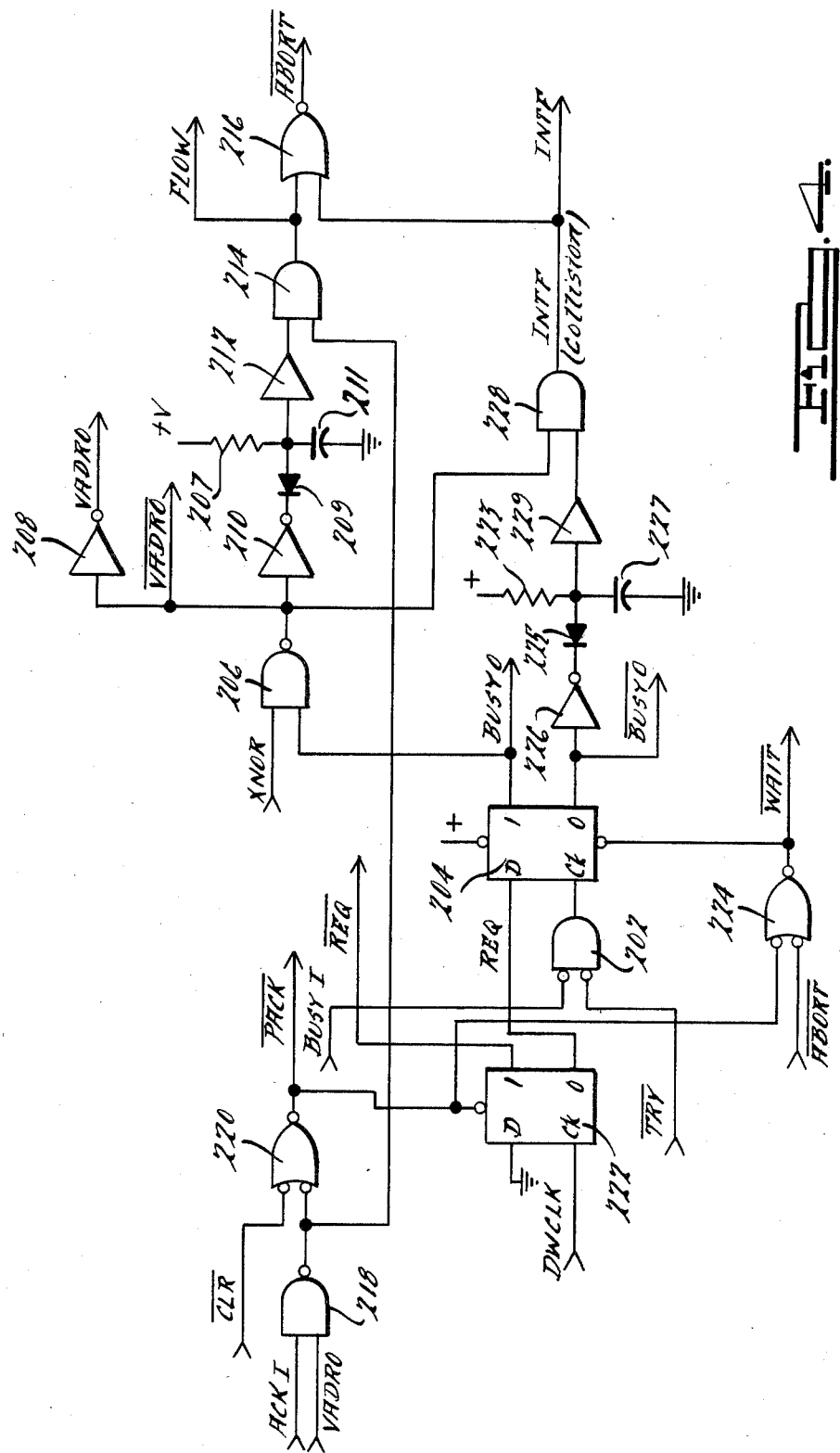

DATA COMMUNICATION SYSTEM

BACKGROUND OF THE INVENTION

1. Field of the Invention.

The present invention relates to a data communication system employing improved packet switching techniques for extending the communication coverage between local networks in an efficient, responsive and reliable manner over a wide geographical area.

2. Description of the Prior Art.

Store-and-forward switching has existed for years in telegraphy, where it is commonly called message switching. Message switching is intended primarily for non-real-time traffic of messages between people. Typically, a telegraphic message switching system employs a star-structured network having a centrally dominating storage facility at the center. The messages are usually filed for retrieval at some future time for delivery in a fraction of an hour over large distances.

In the field of data communications, a type of store-and-forward switching system has been used which is called packet switching. Packet switching is intended primarily for real-time, machine-to-machine traffic, including that between terminals and computers. Packet switching systems such as Arpanet and Telenet are in wide use in this country and are well known to those skilled in this art.

In general, transmission of data in a packet switching system achieves delivery of each packet or message in a fraction of a second and is essential for machine-to-machine interactive communication. Packet systems are usually of a mesh structure of interconnected switching nodes with no particular dominating location and individual packets are deleted from each transmitting node memory as soon as they are correctly received at the next node. Each packet is made up of a group of binary digits which includes a header portion of source and destination address data, call control signals and possibly error-control information in a specified format and a data portion. In such systems, messages are directly sent from a terminal or host computer to a corresponding packet switching-node processor. The messages are formatted at the switching-node processor into one or more packets and are then transmitted to another switching-node via a transmission channel until they reach their destination. Each switching-node that receives the packet stores the packet, examines the destination address on each packet and selects the next switching node for transmission on the route. Sometimes the most direct route is not selected because of equipment malfunctions or message traffic congestion on a particular route. In such cases, another route will be selected by the switching node. Each switching-node processor is conventionally designed to make selections and routing decisions for expeditious transfer of the packet.

In conventional packet switching systems, long messages are chopped into slices (packets) of a nominal 128, eight-bit bytes. Since packets are relatively small, they can be queued in the memory of the respective switching node processors and passed rapidly from node to node. At the destination node, the original message is reassembled from the packets received by the destination switching node processor and passed to its corresponding terminal or host computer.

There is, of course, some delay in transmitting complete messages in a packet switching system and these delays are caused not only by the length of the packets that are relayed through the system but also by the propagation and queuing delays contributed by the number of intermediate nodes or hops that may be required to switch packets between the source and the destination.

Recently, several new techniques for short-distance, high-speed data communications systems, have been introduced, which are termed local networks. A local network is a system designed to interconnect computers and terminals over a restricted geographical area, typically less than 2 kilometers in distance. A number of implementations exist which range from star, ring, and bus structure topologies. Devices which connect to the local network must adhere to some standard set of interface procedures. Data transmitted from a source device flows through the network as destination addressed packets without being stored for any length of time within the network itself. Local networks are generally characterized with low packet transmission delays, low error rates, and usually employ both broadcast and multi-address communication features.

Local networks usually share a common transmission facility or medium; and some type of contention access is used as a means for multiplexing or sharing this common medium resource. In a contention system, devices are free to transmit over the network medium whenever they have data to send. The devices are designed to eliminate the occurrence of multiple devices simultaneously sending packets over the common medium, since simultaneously or overlapping transmissions would destroy the transmitted packets in whole or in part. In such systems, conflict resolving techniques are used, such as described in commonly assigned U.S. Pat. No. 4,234,952, which is incorporated herein by reference.

Local networks utilizing contention access can be quite efficient and reliable since they eliminate the need for any complicated control information to flow between network stations. Contention networks, however, have certain limitations in the area of network distance, packet size and data rates, since the propagation delay of the medium determines the vulnerable time in which contention may occur. As such, contention networks are normally restricted to a local area of approximately 2 kilometers.

Interconnection of local networks has been achieved by using packet gateways and appropriate software addressing techniques. Gateways are used for coupling point-to-point systems, whereby each gateway repeats those packets addressed to itself as an intermediary. Since gateways have both packet buffers as well as addresses, a number of gateways may be used to interconnect each local network. Hence, a failure of the gateway need not partition a local network from interconnection of other networks. A more complete description of that technique is given in the article entitled "A Protocol for Packet Network Communication", published in Vol. Com-22, No. 5, May, 1974 of *IEEE Transactions on Communications* and is incorporated herein by reference.

The gateway technique is similar to the store-and-forward packet switching techniques in that queue delays, as well as switching delays, for routing are incurred for each of the intermediate gateways. Hence, the system performance degrades to a typical store-and-forward packet switching network.

SUMMARY OF THE INVENTION

Local networks are characterized by high speed, low delay and multi-addressing capability. It would be most desirable to extend those local network characteristics to an interconnection system between widely-dispersed local area networks. The present invention employs dedicated hardware to extend the interconnection of networks and achieve the aforementioned desirable characteristics by providing interconnection of networks in an efficient, highly responsive and reliable fashion over either a near or wide geographical area. The present invention provides a technique for achieving a high speed, low delay packet transfer network and is based upon a multiple-access contention star (MACS) approach. In this system, a multiple access contention broadcast bus medium is employed which provides a central passive interconnection for a plurality of local networks. The bus medium comprises a plurality of conductor lines of limited length (less than 1 meter) in order to minimize propagation delays and traffic conflicts on the bus. The conductors of the bus are designated according to their dedicated use as "ADDRESS", "MESSAGE" or "CONTROL" lines. The bus medium is shared by several bus interface modules which each have contention access that is independently handled in each interface without a system arbitrator or master clocking mechanism. The passive nature of the bus medium provides system reliability, since the effects of failures in active components or electronics are confined locally to the corresponding interface module.

Connections of each local network to the contention bus interface modules are made either with short or long distance serial data links such as fiber optic, coaxial cables, RF channels or microwave links. Nominal data transfer rates are 1 M bits/sec. or less on the serial links and an aggregate of 160 M bits/sec. over the passive contention bus medium. Each computer network is attached to the serial data channel through a processor interface module which employs a direct memory access scheme (DMA). The DMA reduces the overhead in transmitting and receiving data packets by the local network computer.

Logical data connections can be established between any pair of computers. In addition, data can be multi-cast by transmitting to several computers of a designated group or broadcast by transmitting to all the connected computers. Even though data transfer rates between computers may be different, the network hardware controls the data flow rate to be compatible with the rate of the receiving station.

This system provides a single switching node between the computer networks which share the contention bus. Applications for such a system range from high-speed remote access of signal processing computers in a manufacturing facility or laboratory, to communications in a distributed microprocessor based control system on a vehicle, to that of interconnecting local networks.

The bus interface modules connected between each local network and the contention bus contain inout/output ports connected to each conductor of the contention bus. The interface functions in three modes defined as an "IDLE" mode, in which the interface monitors both the contention bus and its associated serial link; a "RECEIVE" mode to accept information data designated for it only on the contention bus; and a "TRANSMIT" mode to send information data via the contention bus to addressable receiving local networks as selected by the corresponding local transmitting network.

In a TRANSMIT mode, the corresponding bus interface module receives an addressed message from its associated local network via the serial data link in two byte data sets. The bus interface module formats the message into miniature data sets referred to herein as "mini-packets".

For reference purposes, mini-packets may be on the order of 2-3% of the size of conventional packets as mentioned above. The size of each mini-packet is determined by the number of ADDRESS and MESSAGE lines in the contention broadcast bus that are provided for address and message data transmission. In this system, each mini-packet is transmitted as a single bit length with each bit of the mini-packet placed on a separate conductor line of the contention bus.

The mini-packets are formatted into two groups for transmission. The first group contains the destination address in the header (address) portion for output on the ADDRESS lines and the source address (identity of the transmitting interface module) along with word count information in the message data portion for simultaneous output on the MESSAGE lines. If more than one network is desired to receive the message, the system takes on the characteristics of a multi-cast system and the first group of mini-packets would contain a separate mini-packet for each destination address. On the other hand, if all networks are intended to receive the message, in a broadcast arrangement, a unique broadcast address is contained in the first group of mini-packets as a common destination address.

The second group of mini-packets contains only the source header (address) in the address portion and contains message information in the message data portion. The number of mini-packets in the second group corresponds to the number necessary to complete the transmission of the message and corresponds to the word count number transmitted with the first group of mini-packets.

The interface modules utilize a contention protocol to gain access to the contention bus prior to each transmission of a mini-packet. Once access is achieved, a portion of the access time is spent monitoring the bus to make sure no other traffic is being sent by other interface modules. Due to the fact that the contention bus is short, the propagation delays are extremely short. Therefore, that period of the access time when the transmitting module is monitoring the contention bus for interfering traffic may be selected to be many times the propagation delay and still be a relatively short period. Once it is determined that the contention bus is clear, the contention bus interface module transmits a mini-packet on the contention bus and monitors a dedicated CONTROL line for an acknowledgment signal, for a period of time before the end of the access period. Acknowledgement signals are transmitted by the destination module whenever it recevies an appropriately addressed mini-packet.

Logic circuitry is provided in each interface module to release its transmission access to the contention bus, whenever other traffic is sensed on the contention bus or when no acknowledgment signal is received. Random timing circuitry is also provided in each interface module that determines the period of time that must be waited before that released interface module again seeks access to the contention bus.

In the IDLE mode, each interface module normally compares the data received in its address ports connected to the ADDRESS lines of the contention bus with its own identity address. Whenever a module in the IDLE mode receives a mini-packet containing its own identity address on the ADDRESS lines, it gates the accompanying message data on the MESSAGE lines, which includes the source address and word count data, to appropriate registers. It also enters the RECEIVE mode of operation and sends an acknowledgment signal on the corresponding CONTROL line.

In the RECEIVE mode, the interface module compares the subsequent data received on its address ports with the stored source address. Whenever the module receives a mini-packet containing an address the same as the stored source address on its address ports, it gates the accompanying message data to appropriate registers for transfer to the associated local computer network and sends an acknowledgment signal on the corresponding control line. The interface module remains in its RECEIVE mode until it receives an end of transmission signal from the source module or whenever its internal timing circuitry signals that too much time has passed since the last mini-packet was received.

It is an object of the present invention to provide a system whereby distantly located local networks are interconnected through a passive switching medium to achieve substantially real-time data communications.

It is another object of the present invention to provide a passive switching medium whereby equipment failures in other local networks connected to the medium will not prevent or delay communications between operating networks.

It is a further object of the present invention to provide high speed data switching between local networks and provide the option of multi-cast or broadcast communications by initially preparing selective ones or all of the local networks, respectively, to receive source identified information and then sending that source identified information on a common switching medium.

It is still a further object of the present invention to provide a multi-channeled passive switching medium in a data communication system with separate address, message and access control channels whereby each local network in the system is connected to each of the channels provided on the passive switching medium.

BRIEF DESCRIPTION OF THE DRAWINGS

FIG. 4 is a detailed logic diagram of the bus access control circuit indicated in FIG. 2.

DETAILED DESCRIPTION OF THE PREFERRED EMBODIMENT

Figure 1:
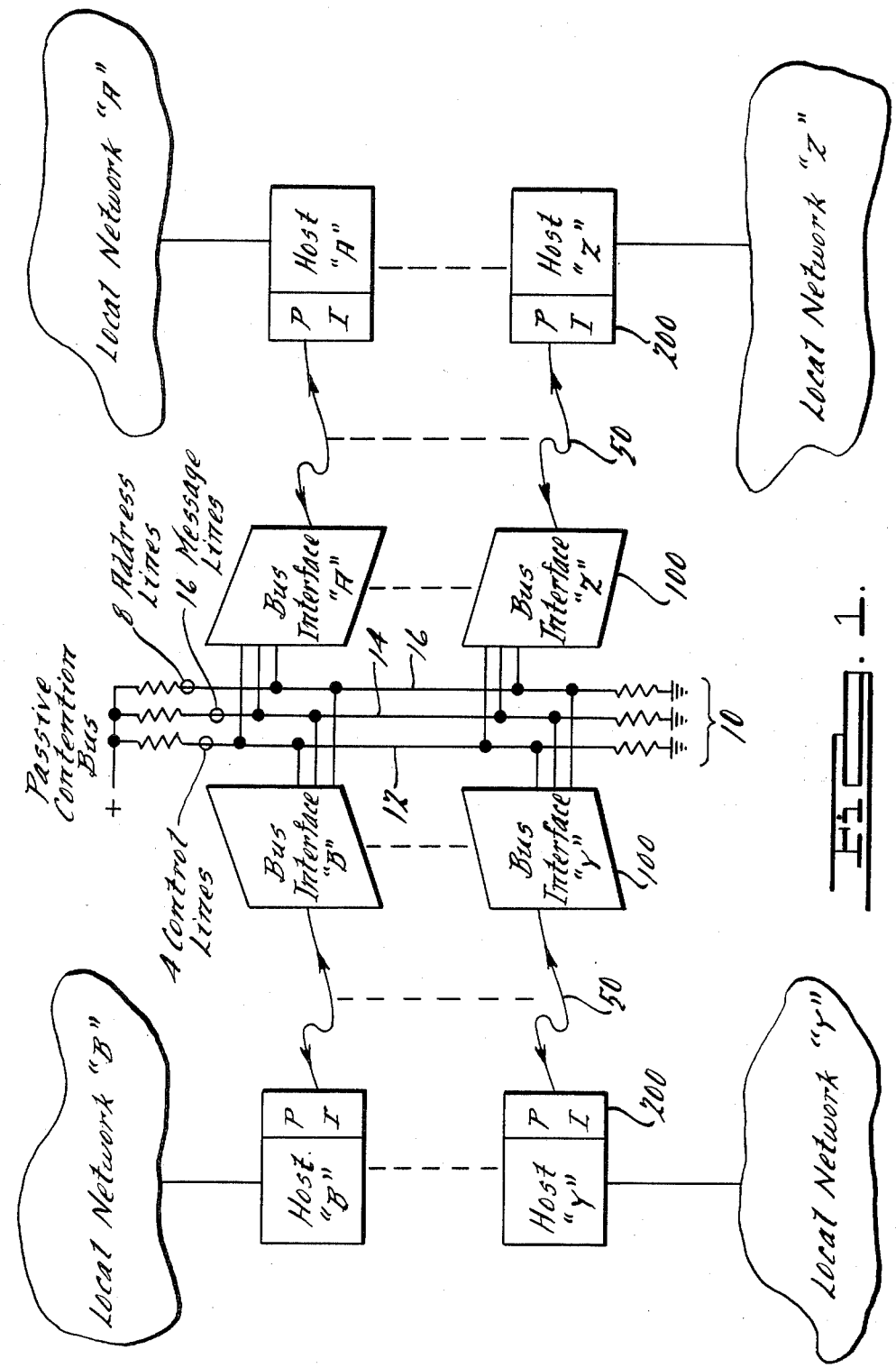
FIG. 1 is a block diagram illustrating the topographical structure of the present invention.

In FIG. 1, a block diagram illustrates the topographical structure of the present invention whereby several local computer networks (A,B, . . . Y,Z) are interconnected to each other through a passive contention bus 10 in a star configuration. The star configuration is realized by the use of the passive contention bus 10 as the central switching node for all of the interconnected local networks and each local network is connected via a host computer and an associated local processor interface 200 through a serial data link medium 50 to the dedicated contention bus interface circuit 100. The passive contention bus 10 is made up of a plurality of conductor lines that are symbolized in FIG. 1 in three conductor groups. Conductor group 12 is made up of four CONTROL lines which are designated: "Busy Bus"; "Valid Address"; "Acknowledgment"; and "End of Transmission" lines. Conductor group 14 comprises sixteen MESSAGE lines and Conductor group 16 comprises eight ADDRESS lines.

Each of the bus interface circuits 100 is connected to each of the 28 lines, which make up the passive contention bus 10, through corresponding control, message and address ports.

Figure 2:
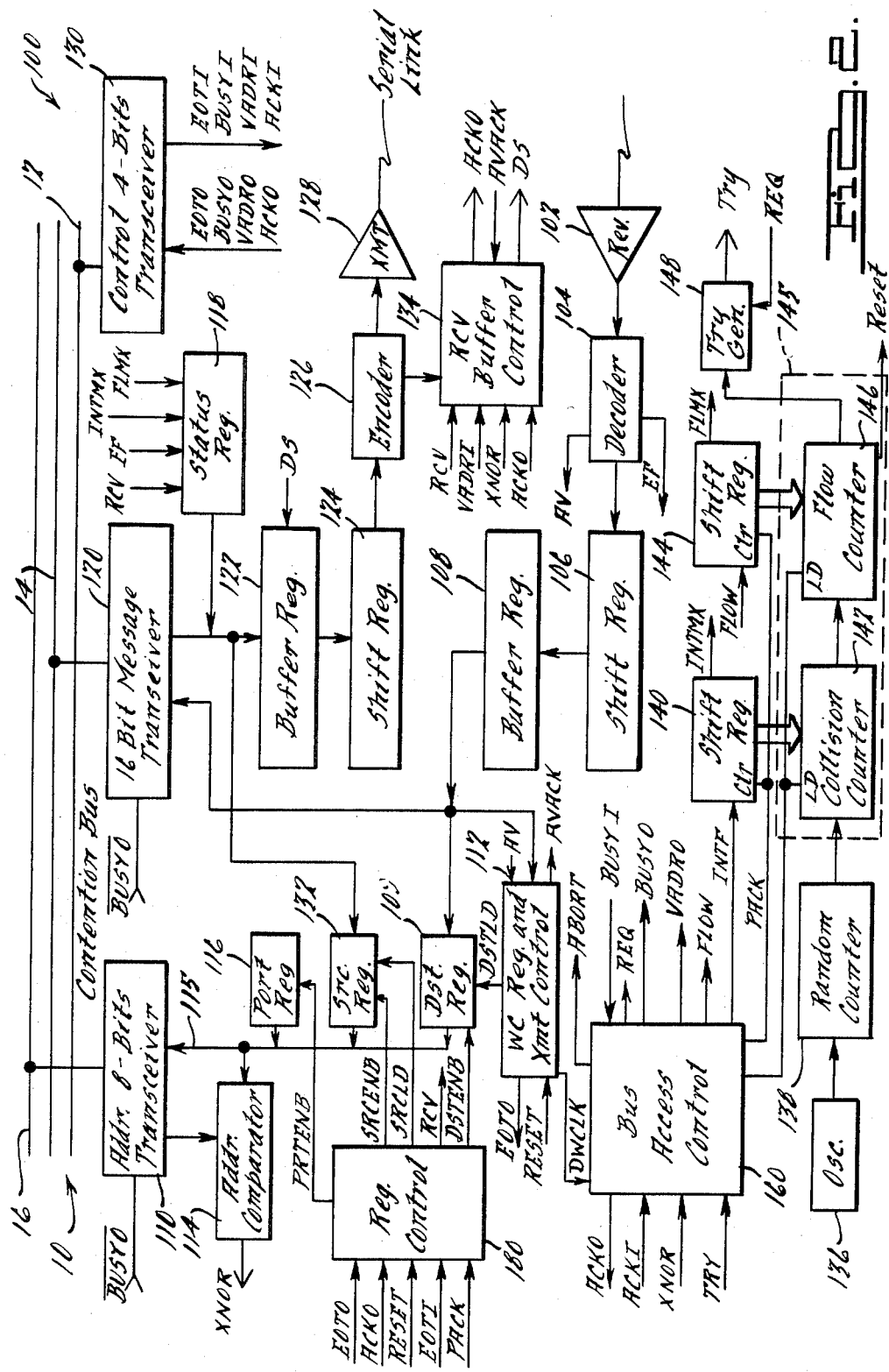
FIG. 2 is a detailed block diagram of a preferred embodiment of the contention bus interface circuit employed in the present invention as it is connected to the passive switching medium.

In FIG. 2, a bus interface circuit 100 is shown in a more detailed block diagram wherein as address transceiver circuit 110 is indicated as having the facility for gating eight data bits of parallel output or input through eight address ports permanently connected to the eight ADDRESS lines 16 of the contention bus 10. In addition, a message transceiver circuit 120 is indicated as being able to gate sixteen parallel data bits through sixteen corresponding message ports directly connected to the sixteen MESSAGE lines 14 of the contention bus 10. Furthermore, a control transceiver circuit 130 is indicated as gating four control bits on four control ports connected directly to the four CONTROL lines 12 of the contention bus 10.

The serial link 50 provides two-way communication between the bus interface circuit 100 and the associated host computer. The serial link 50 may be of any high efficiency medium, such as fiber optics, microwave, rf channel or coaxial cable selected to satisfy the needs of the user.

A receiving amplifier 102 is provided in the bus interface circuit 100 to receive data from the corresponding host computer and its local network for transmission to one or more of the other addressable local networks connected to the contention bus 10 through their respective bus interface circuit 100. The output of the receiver amplifier 102 is connected to a decoder 104 which converts the received information to high and low DC levels for serial input to a shift register 106. The decoder 104 also outputs an AV (data available) signal to a word count register and transmit control circuit 112, which is used to either generate a DWCLK (down clock) signal that is output to a bus access control circuit 160 for commencing access to the contention bus 10, or to generate an AVACK signal that is output to a RCV buffer control logic circuit 134 for flow control between the local network computer and the bus interface circuit 100. The shift register 106 operates in conjunction with a buffer register 108 to provide parallel data thereto for temporary storage.

Figure 3:
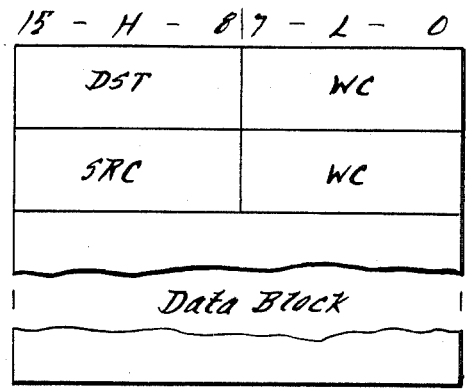
FIG. 3 illustrates the format of a message packet as it arrives in two-byte segments on the serial link to the contention bus interface circuit.

There are two types of data incoming to the receiver amplifier 102. One is an acknowledgment packet when the bus interface circuit 100 is in its RECEIVE mode. The other is in two eight-bit bytes formatted as shown in FIG. 3. In the latter format, a first set of two bytes contains the destination address for the message, as selected by the host computer, and word count information. A second set of bytes contains the identity address of the host computer (source address) and word count information for transmission. The following sets of bytes contain message data and correspond to the number of two-byte words indicated by the word count information. The shift register 106 operates in conjunction with a buffer register 108 to provide parallel data thereto for temporary storage.

The buffer register 108 provides destination address data from the first set of bytes for loading in a destination address register 109 and the word count information for loading in the word count register and transmit control circuit 112.

When the next set of bytes is received from the host computer which contain the source address and the word count data, it is output from the buffer register 108 to the message transceiver 120 as message data to be placed on the sixteen MESSAGE lines 14.

Of the four CONTROL lines 12 connected to the ports of the control transceiver 130, the bus access control logic circuit 160 monitors the Busy Bus and the Acknowledgment lines. The Busy Bus line is utilized to acquire access to the contention bus 10 and for indicating to all other users when access is being requested or acquired by another. In this embodiment, the Busy Bus is normally at a high level (greater than 1.5 volts), when it is idle and at a low level (less than 0.7 volts), when it is accessed.

FIG. 4 illustrates a logic diagram of the bus access control circuit 160 wherein the TRY (negative logic) signal is gated with a BUSY I (in) signal from the control transceiver 130 in AND gate 202. When the BUSY I signal from control transceiver 130 indicates that there is no traffic present on the contention bus 10, the bus access control logic circuit 160 outputs a BUSY O (out) signal from a flip-flop circuit 204 to the control transceiver 130, which sets the Busy Bus to a low level.

Figure 5:
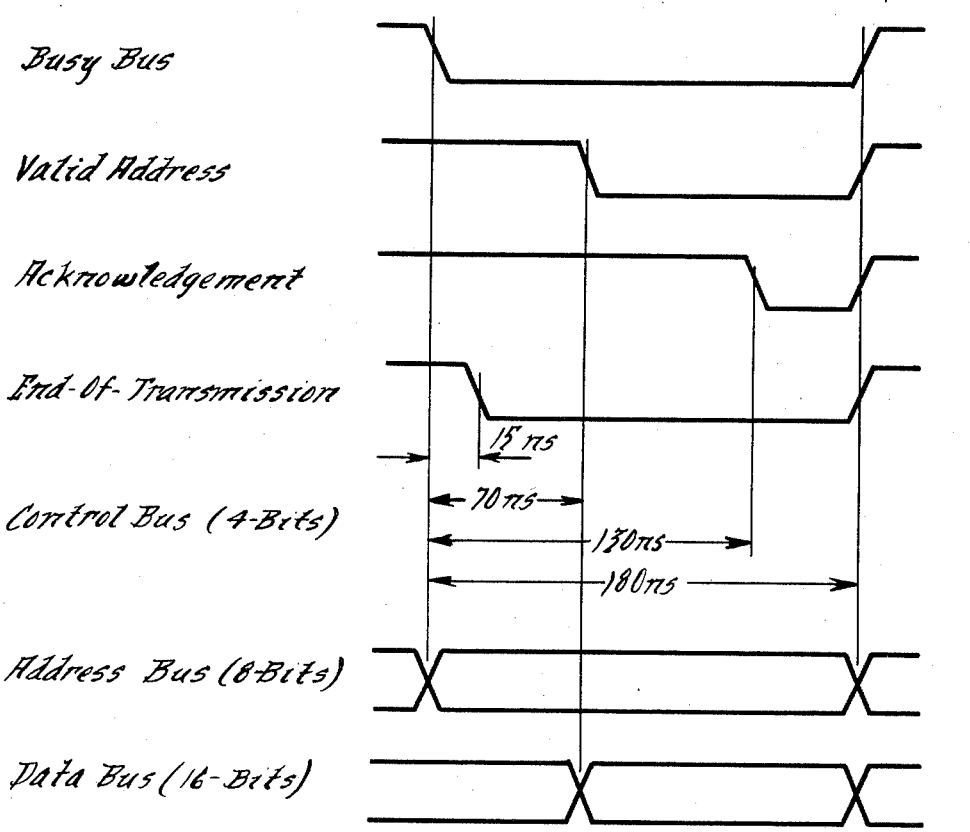
FIG. 5 is a time chart illustrating the sequence of events which occur during the time a particular contention bus interface circuit has access to the contention bus medium.

FIG. 5 illustrates a timing diagram for the transmission of CONTROL, ADDRESS and MESSAGE data on the contention bus 10. The contention bus 10 is accessed by a BUSY O signal applied to the control transceiver 130, which responsively activates the Busy Bus of the CONTROL line 12. Simultaneously, the eight-bit destination address is output from the address transceiver 110 by appropriate binary actuation of selected ones of the ADDRESS lines as dictated by the destination address stored in the enabled destination register 109.

The address comparator circuit 114 compares the eight-bit address present on the internal bus 115 with the eight-bit address sensed on the ADDRESS lines 16 of the contention bus 10. If those addresses correspond, then the address on the contention bus 10, is confirmed as being a correct (valid) address and the address comparator 114 outputs a XNOR signal.

At approximately 70 nanoseconds following access to the contention bus 10, a VADR O signal is applied to the control transceiver 130 which responsively activates the Valid Address line of the CONTROL lines 12. The VADR O signal is derived from the bus access control circuit 160 as a result of the simultaneous occurrence of the BUSY O signal and the XNOR signal from the address comparator circuit 114, at the input to NAND gate 106. The output of NAND gate 206 is fed to an inverter 208 where the VADR O signal is output.

When the BUSY O signal is output from flip-flop circuit 204, it is also applied to a valid address timer circuit, which provides a predetermined period (approximately 160 nanoseconds) for the address comparator 114 to output an XNOR signal. If the XNOR signal is not provided within the period to the NAND gate 206, the valid address timer, which comprises an inverter 226, a diode 225, resistor 223, charging capacitor 227 and an amplifier 229, outputs a signal to AND gate 228 which in turn gates out an INTF (interference) signal to indicate that a collision of address signals has occured on the contention bus. The INTF signal is fed to a NOR gate 216, which outputs an ABORT signal to command cancellation of access to the contention bus and abort the transmission.

Of course, when no collision occurs and a VADRO signal is generated within the period, sixteen bits of message data are placed via the message transceiver 120 on the MESSAGE lines 14 of the contention bus 10 for the remainder (approximately 110 nanoseconds) of the access period.

Figure 6:
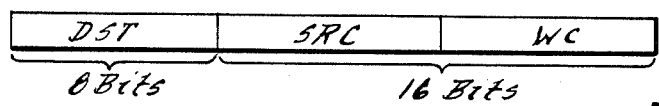
FIG. 6 illustrates the format of mini-packets within the first group.

FIG. 6 illustrates the mini-packet format for a first group of data of a message to be transmitted on the contention bus 10. In that first group of mini-packets, the eight-bit destination address is output on the eight ADDRESS lines 16; and an eight-bit source address along with an eight-bit word count number are output on the sixteen MESSAGE lines 14 of the contention bus 10. In a multi-cast situation where the host computer selects several local networks to receive the message, the first group will contain a separate mini-packet for each designated recipient with its corresponding address as the destination address. In a broadcast situation where the host computer provides a message that is intended to be received by all the local networks connected to the system, the first group will contain a single specially coded mini-packet (e.g., the three most significant bits will be all ones) for the destination address, that each local network will recognize and respond to.

Figure 7:
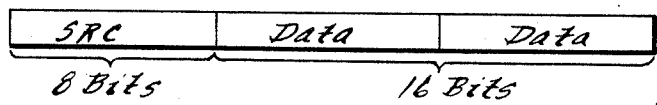
FIG. 7 illustrates the format of mini-packets within the second group.

FIG. 7 illustrates the format for a second group of mini-packets in which the eight-bit source address is output on the eight ADDRESS lines 16; and sixteen bits of message data are output on the sixteen MESSAGE lines 14 of the contention bus 10.

At the bus interface circuit 100 associated with the local network designated as the intended recipient (destination) of the message, the signals present on the ADDRESS lines 16 of the contention bus 10 are continually being compared in its address comparator circuit 114 with its own identity address stored in a port register 116, and present on an internal bus 115 while it is in its IDLE mode of operation. When an address is present on the ADDRESS line 16 of the contention bus 10 that is found to match the identity address on the internal bus 115 from the port register 116, an XNOR signal is generated by the comparator 114.

A RCV buffer control logic circuit 134 receives that XNOR signal and a Valid Address In (VADRI) signal from control transceiver 130, which has a port connected to the Valid Address line of CONTROL lines 12. When both the XNOR and VADRI signals occur, the RCV buffer control logic circuit 134 gates an acknowledgment ACKO signal to transceiver 130 to activate the Acknowledgment line of the CONTROL lines 12. This generally occurs at approximately 130 nanoseconds following the start of the access period. The message data are temporarily stored in the buffer register 122 and are strobed by a DS signal to a shift register 124, encoder 126, amplifier 128, and onto the serial line 50. The ACKO signal is also fed to a register control logic circuit 180 and used to gate a source load (SRCLD) signal that commands the source address register 132 to load the eight bits, corresponding to the Source Address received by the Message transceiver 120 on the MESSAGE Lines 14 of the contention bus 10.

The register control logic circuit 180 also produces a source enable (SCRENB) signal when the bus interface circuit 100 is in its RECEIVE mode, whereby the source address stored in the source address register 132 is placed on the internal bus 115 and compared in comparator 114 with the signals corresponding to those present on the ADDRESS lines 16 of the contention bus 10.

Subsequent words of the transmittal message are in the form of mini-packets included in the second group, wherein the source address is present on the ADDRESS lines 16 and message data is present on the MESSAGE Lines 14 of the contention bus 10. Each time the address comparator 114, of the bus interface circuit 100 in its RECEIVE mode, validates that the signals on the ADDRESS lines 16 match the source address on its internal bus 115 and that the VADRI signal is also present due to the Valid Address line of the CONTROL lines 12 being activated, the Message data is gated through the Message transceiver 120 into Buffer Register 122 and an ACKO signal is generated for corresponding activation of the Acknowledgment Line of the CONTROL lines 12.

As mentioned above, when a bus interface circuit 100 receives the first two bytes from its associated local network host computer containing the destination address and word count information and enters its TRANSMIT mode, the destination address is stored in the destination address register 109 and the word count is stored in the word count register and control circuit 112. Subsequently, each time a mini-packet of data is transferred from the buffer register 108 to the message transceiver 120, the word count register is decremented by one. When the last mini-packet is transmitted, the word count register will provide an End of Transmission (EOTO) output signal to activate a dedicated End of Transmission line of the CONTROL lines 12 on the contention bus 10.

The receiving bus interface 100 senses the End of Transmission line and generates an end of transmission (EOTI) signal, to enable its port register 116 and to allow the bus interface circuit 100 to drop out of its RECEIVE mode and enter its IDLE mode. In the IDLE mode, the bus interface circuit 100 again monitors the ADDRESS lines 16 of the contention bus 10.

A buffer register 122 is connected to receive gated data through the message transceiver 120 from the MESSAGE Lines 14 of the contention bus 10. The data in the buffer register 122 is parallely transferred in response to the data strobe DS signal to a shift register 124 where it is serially output to an encoder 126 for transmission through an amplifier 128 on the serial link 50 to the corresponding host computer. A receiver buffer control logic circuit 134 controls the rate at which the data is parallely transferred from the buffer register 122 to the shift register 124 for transmission on the serial link 50 to the local host computer by providing the data strobe DS signal to the buffer register 122.

When the transmitting bus interface circuit 100 seeks to gain access for transmitting the next mini-packet on the contention bus 10 by monitoring the Busy Bus line of the CONTROL lines 12, it will not generate a BUSY O signal to request access until it senses that the Busy Bus line is not accessed by another. Upon requesting access to the contention bus 10, by activating the Busy Bus line, the destination address is placed on the ADDRESS lines 16. However, if the address present on the ADDRESS lines 16 is sensed as different than the destination address supplied by the destination address register 109 on the internal bus 115 to the comparator 114, then an interference INTF signal is provided by the bus access control logic circuit 160. The INTF signal is employed to command that the access request be removed by cancelling the BUSY O signal, to remove the destination address from the ADDRESS lines 16, to load a collision counter 142 with the contents of a shift register 140 and delay the generation of the next TRY signal until a randomly selected period of time has passed. This provision tends to reduce the occurrence of collisions due to several bus interface circuits 100 attempting to simultaneously access the contention bus 10. A random counter 138 precedes the collision counter 142 so that pulses from the oscillator 136 to the collision counter 142 will be delayed by an amount depending on the content of the random counter 138 when the collision counter 142 is loaded.

An INTMX status signal indicates the maximum number of consecutive times an interference condition has been detected for the same mini-packet and is provided by the collision shift register 140 for the status register 118. The INTMX status signal is forwarded on to the buffer register 122 and transferred to the associated local network via serial link 50 to inform that network of an error condition. That local network responsively terminates the session until the problem has been corrected.

When the collision wait period expires, a TRY signal is again generated through TRY generator logic 148 and the bus access control logic circuit 160 again monitors the Busy Bus line to see if it is activated by another. If not, it will again set the BUSY O and sequence through the valid address checks.

The abort routine is intended to provide a period of time for each bus interface to wait after sensing a collision before again attempting to access the contention bus 10. In order to minimize the reoccurrence of collisions each bus interface circuit 100 contains a random counter 138 in series with an oscillator 136, for providing a random delay period before again attempting access to the contention bus 10.

The period for retransmission is selected by loading:

$$2^8(2^{NF}-1)+2^{NC}-1$$

into the collision down-counter 142 and the flow down-counter 146 from corresponding shift registers 140 and 144.

The exponent NC, in the above expression, corresponds to the number of collisions that occur for each transmission and is increased for each collision so that the period for down-counting is increased for each subsequent occurrence of a collision of a particular mini-packet.

The exponent NF, in the above expression, corresponds to the number of times a mini-packet is transmitted without sensing a return acknowledgment on the Acknowledgment line within a period of time determined by the timing circuit shown in FIG. 4.

Upon the occurrence of the BUSY O signal and the XNOR signal gated through NAND gate 206, in the transmitting bus interface circuit 100, the low level output of NAND gate 206 is inverted to a high level voltage by inverter 210 which starts the timing function in the valid address timing circuit formed by diode 209, resistor 207, and charging capacitor 211. When the voltage at the junction of those elements reaches a sufficient threshold level (approximately 350 nanoseconds later) it switches the amplifier 212 to present a high level input to AND gate 214. An inverted ACKI (high level) signal is placed on the other input of AND gate 214 from NAND gate 218. If an ACKI signal is not generated from control transceiver 130 before the timer reaches the threshold level, a FLOW signal will be output from AND gate 214 to indicate that the transmission was not received by the designated destination bus interface circuit and its associated local network. The FLOW signal will cause the NF value in shift register 144 to be indexed by one and the ABORT routine will begin to reschedule a retransmission.

If, on the other hand, an ACKI signal is produced by the control transceiver 130 due to the Acknowledgement line being active, it is applied to the bus access control circuit 160 where it is used to inhibit the generation of the ABORT signal. The ACKI signal is gated through NAND gate 218 by the VADRO signal and prevents the output of the valid address timer from being gated through AND gate 214 to trigger the ABORT signal. The ACKI signal, gated through NAND gate 218 is also effective to cause a PACK signal to be generated which clears registers 140 and 144, thereby resetting exponents NC and NF to 0. The PACK signal from NOR gate 220 also resets the flip-flop circuit 222 so that it will then be responsive to a DWCLK signal for the next request for transmission and set up the flip-flop circuit 204 to receive the output of AND gate 202, which triggers flip-flop 204 when the TRY and BUSY I signals respectively indicate both a desire to transmit a mini-packet and a clear Busy Bus.

Successive incomplete transmissions cause the wait period to be increased exponentially in order to give the receiving bus interface circuit time to process the previously transmitted mini-packet. After a predetermined number of tries, if no acknowledgment is received, flow shift register 144 will provide a FLMX status signal for the status register 118, which is used in the same way as INTMX to inform the associated local network of the existence of an error condition. Setting limits on the number of attempts relieves the contention bus 10 of useless traffic and decreases the chances for needless collisions during periods of heavy traffic.

Figure 8:
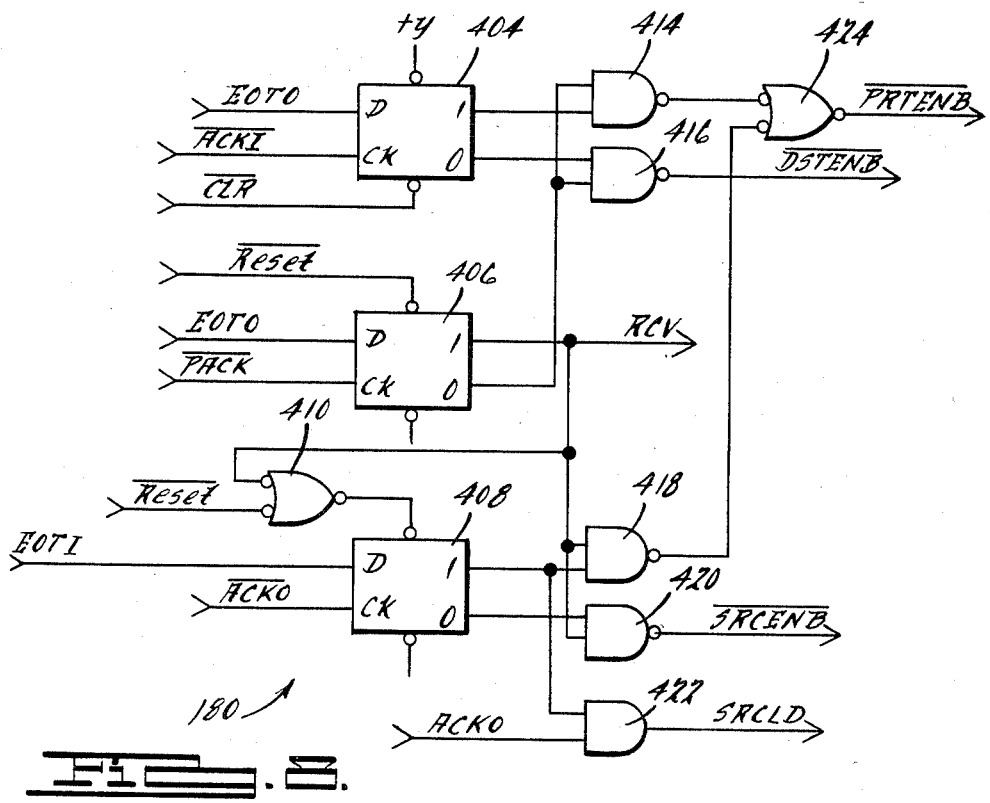
FIG. 8 is a detailed logic diagram of the register control circuit indicated in FIG. 2.

In FIG. 8, the register control logic 180 is detailed whereby the PRTENB signal is output from NOR gate 424 and enables the PORT register 116 to provide the identity address of its corresponding bus interface circuit 100, to be supplied to the internal bus 115. The PRTENB signal is output whenever the corresponding bus interface circuit 100 is in its IDLE mode or during the transmission of the second group of mini-packets while in its TRANSMIT mode. The PRTENB signal is turned off whenever the corresponding bus interface circuit 100 enters the RECEIVE mode, via NAND gates 414 and 418.

The DSTENB signal is output from a NAND gate 416 of the register control logic 180 and applied to enable the destination register 132 to supply its stored destination address to the internal bus 115 when the corresponding bus interface circuit 100 enters its TRANSMIT mode and until the first group of mini-packets, which indicate the individual local networks intended to receive the following message are transmitted.

The SRCLD signal is output from an AND gate 422 of the register control logic 180 and applied to load the address present on the ADDRESS lines 16 of the contention bus 10 into the source register 132. This occurs as soon as the ACKO signal is generated by the RCV buffer control logic 134 and immediately prior to the corresponding bus interface circuit 100 entering its RECEIVE mode. This loaded source address corresponds to the identity of the bus interface circuit 100 that has identified this bus interface circuit 100 as the recipient of a message.

The SCRENB signal is output from NAND gate 420 of the register control logic 180 and applied to enable the source register 132 to supply the stored source address to the internal bus 115 after the bus interface circuit 100 has entered its RECEIVE mode and has activated the Acknowledgement bus of the CONTROL lines 12 with the ACKO signal and until either the reset timer 145 times out and produces a RESET signal or the EOTI signal is received to indicate that the transmission from the identified source has terminated.

The two-byte data sets transmitted on the serial link 50 from the local network arrive in sequence and are acknowledged in order. A hardware counter in the RCV buffer control circuit 134 is used to determine the window size (i.e., the number of outstanding data sets stored in the system between acknowledgments). This is a flow control scheme which is necessary whenever there is a substantial delay between the local network and its associated bus interface circuit due to the data rate limits or propagation delay on the serial link.

Figure 9B:
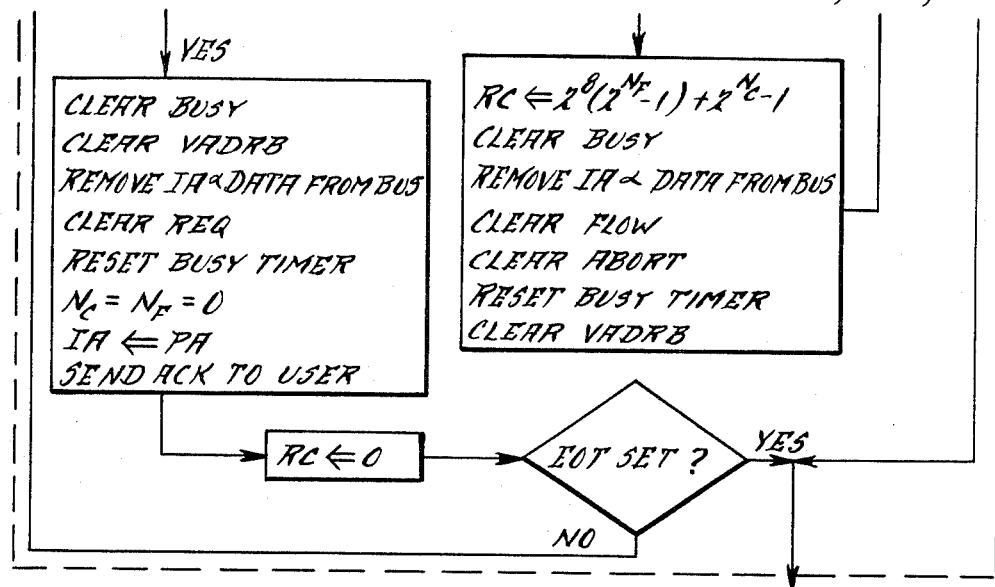
FIGS. 9A and 9B provide a flow diagram which details the various logic decisions performed within the contention bus interface circuit while in its TRANSMIT mode.
Figure 9A:
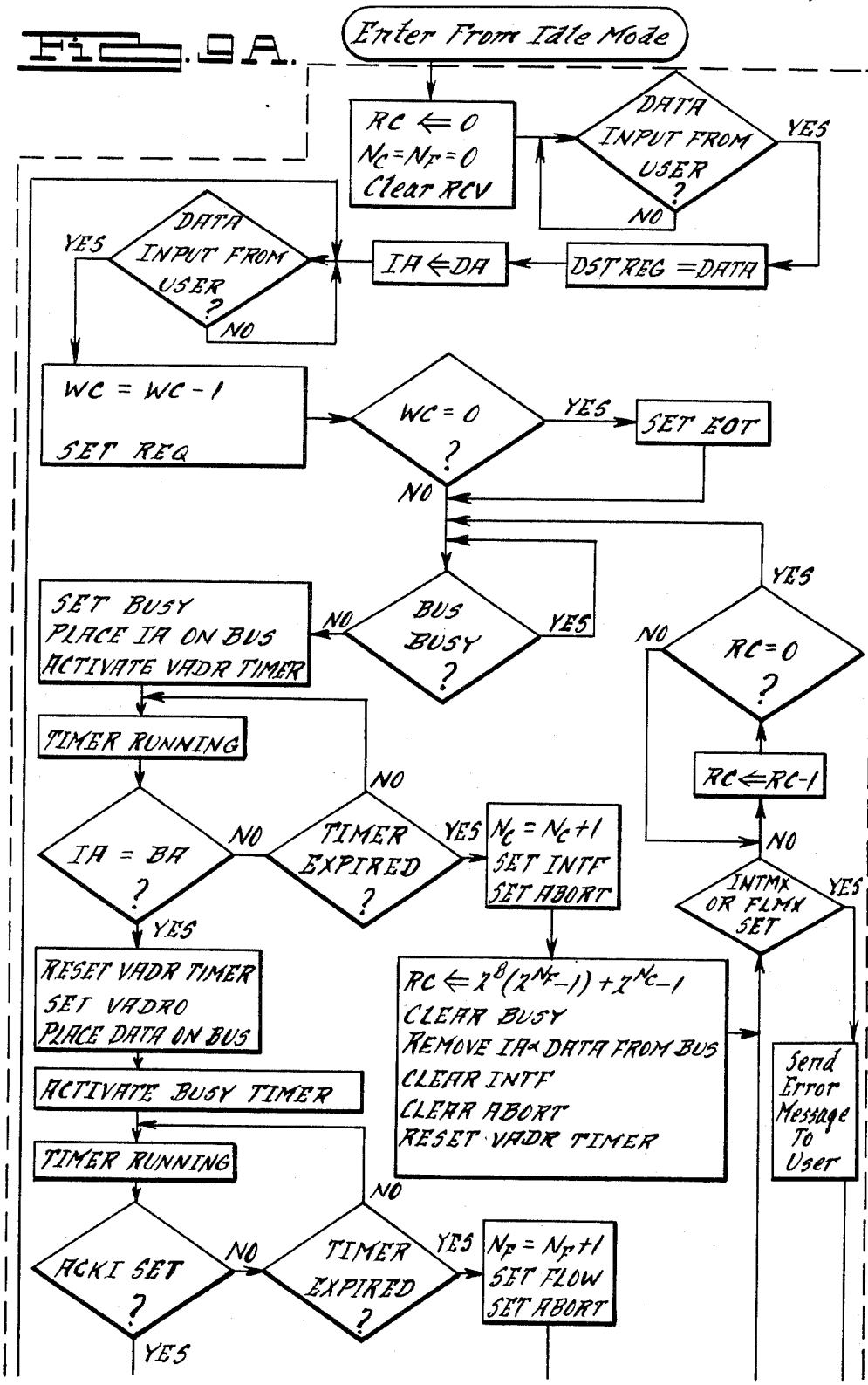

The flow diagram of FIGS. 9A and 9B summarize the sequence of events, described above, that occur when a bus interface circuit 100 enters its TRANSMIT mode in response to a request from its corresponding local network.

Figure 10:
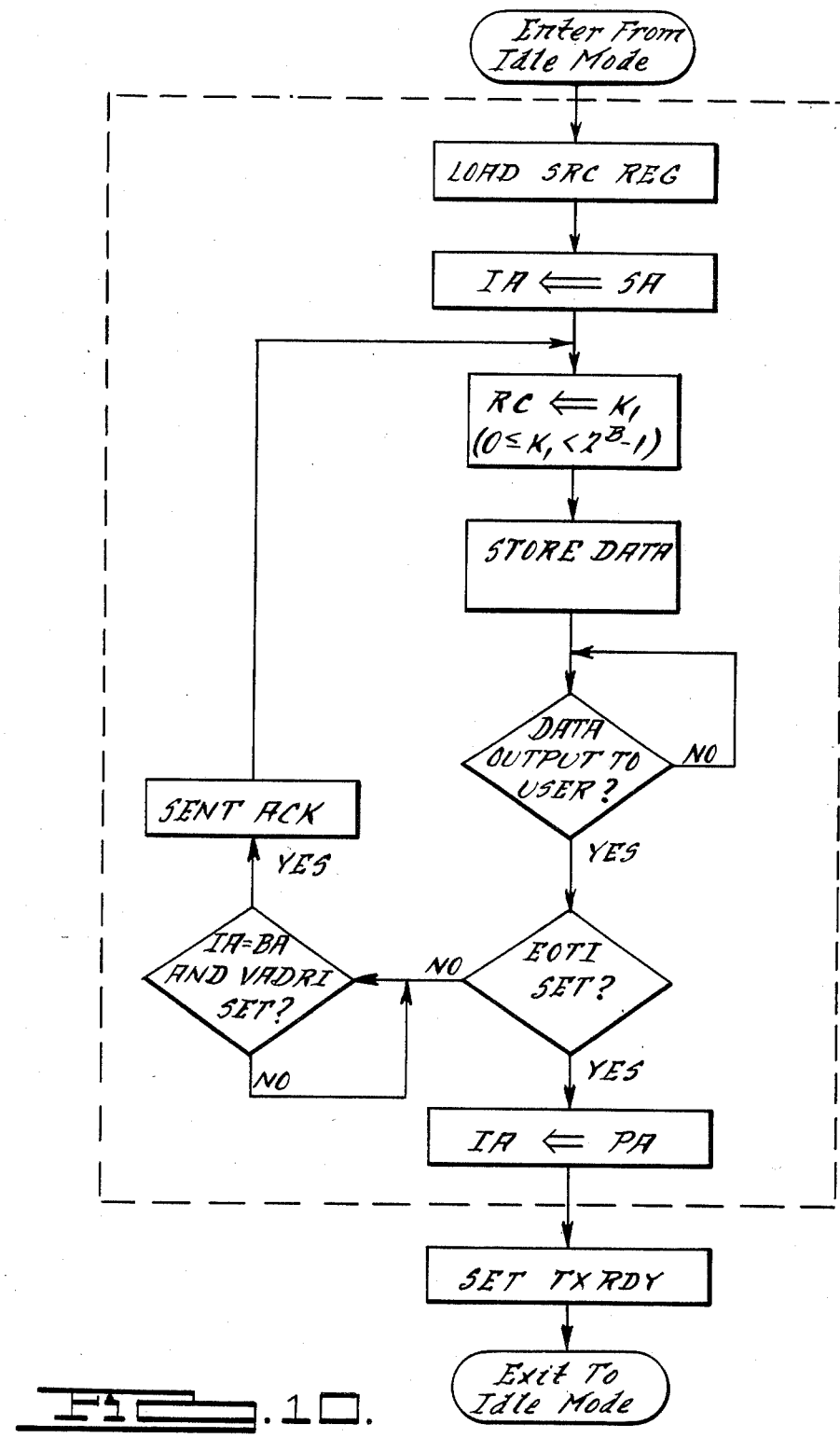
FIG. 10 is a flow diagram which details the various logic decisions performed within the contention bus interface while in its RECEIVE mode.

The flow diagram of FIG. 10 summarizes the sequence of events, described above, that occur when a bus interface circuit 100 is in its RECEIVE mode.

It should be evident from the above description that the present invention offers an advantage of high speed intercommunication between local networks due to the lack of queuing delays and the use of a single switching node. Another advantage allows for a high number of connected local networks to obtain substantially simultaneous use of the contention bus by multiplexing the transmitted mini-packets.

Efficient use of the contention bus is made by the transmission of low overhead mini-packets as a single unit and then releasing access of the bus for another local network to use while the next mini-packet is being formatted for transmission.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A data communication system to provide data transmission between a plurality of local computer networks comprising:

passive bus means, having a plurality of conductor lines dedicated to carrying defined address data, a plurality of conductor lines dedicated to carrying defined control signals and a plurality of conductor lines dedicated to carrying defined message data, for providing parallel interconnection of said plurality of local networks;

a plurality of means respectively connected between a separate correspondingly associated local network and said conductor lines of said passive bus means, for providing separate contention interface between each associated local network and said passive bus means;

means providing a data transmission link between each said contention interface means and its associated local network;

wherein each of said contention interface means includes a plurality of input/output ports connected to such corresponding dedicated conductor lines of said passive bus means and designated as address ports dedicated to parallel receiving and transmitting a set of address data bits, control ports dedicated to receiving and transmitting control signals, and data ports dedicated to parallel receiving and transmitting a set of message information data bits simultaneously with address data bits on said address ports.

2. A data communication system as in claim 1, wherein each of said contention interface means includes means for receiving addressed message packets from its associated local network on said data transmission medium means and for formatting each message packet into a plurality of separately transmittable mini-packets having a bit length not exceeding the total number of dedicated address ports and data ports on each contention interface means, wherein the first group of said formatted mini-packets each contains a first set of bits corresponding to a transmission destination address for output on the dedicated address ports, and a second set of bits corresponding to its own address as a transmission source address and word count information corresponding to the number of mini-packets in the complete message for simultaneous output on the dedicated data ports; and a second group of mini-packets each containing a first set of bits corresponding to the transmission source address for output, following the first group, on the address ports and a second set of bits corresponding to message information data for simultaneous output on the dedicated data ports.

3. A data communication system as in claim 2, wherein each said contention interface means includes:

means for storing predetermined address data uniquely defined as its own address;

means for monitoring said address ports and comparing any destination address data received thereon with its own address and for storing the accompanying source address data present on the data ports when said destination address corresponds to its own address; and means for receiving each subsequent mini-packet on said dedicated address and data ports that provides address data on said address ports corresponding to said stored source address.

4. A data communication system as in claim 3, wherein each said contention interface means includes means for formatting mini-packets received from the passive bus means with the corresponding stored source address for transmission on said transmission medium means to its corresponding local network.

5. A data communication system as in claim 4, wherein each said contention interface means includes:

means for storing its transmitting word count information and for providing a control signal to indicate completion of transmission of the corresponding message packet when that number of mini-packets corresponding to the stored word count data has been transmitted; and means for outputting said completion of transmission control signal on a corresponding control port.

6. A data communication system as in claim 5, wherein each said contention interface means includes means for providing a separate acknowledgment control signal to indicate receipt of each mini-packet having its own address as a destination address on its dedicated address ports and to indicate subsequent receipt of each mini-packet having the source address on its dedicated address ports; and means for outputting said acknowledgment control signals on a corresponding control port.

7. A data communication system as in claim 6, wherein each said contention interface means includes means for monitoring its corresponding acknowledgment control port for receipt of an acknowledgment signal within a predetermined period of time following its transmission of a mini-packet on said dedicated address and message information data ports and for commanding the retransmission of the lastly transmitted mini-packet if no acknowledgment signal is received within said predetermined period of time.

8. A data communication system as in claim 2, wherein said bit length of said mini-packets is 24 bits.

9. A data communication system as in claim 8, wherein said formatted mini-packets include 8 bits which correspond to an equal number of dedicated address ports.

* * * * *